United States Patent
Shuey

Patent Number: 5,933,073
Date of Patent: *Aug. 3, 1999

[54] APPARATUS AND METHODS FOR POWER NETWORK COUPLING

[75] Inventor: Kenneth C. Shuey, Raleigh, N.C.

[73] Assignee: ABB Power T&D Company Inc., Raleigh, N.C.

[*] Notice: This patent is subject to a terminal disclaimer.

[21] Appl. No.: 08/888,773

[22] Filed: Jul. 7, 1997

[51] Int. Cl.$^6$ ........................................................ H04Q 1/00
[52] U.S. Cl. ..................................... 340/310.07; 340/10.5; 340/10.6; 340/10.7
[58] Field of Search .................... 340/310.01, 310.05, 340/310.06, 310.07, 310.03

[56] References Cited

U.S. PATENT DOCUMENTS

| | | | |
|---|---|---|---|
| 3,611,201 | 10/1971 | Goell | 333/18 |
| 3,702,460 | 11/1972 | Blose | 340/150 |
| 3,942,168 | 3/1976 | Whyte | 340/310 R |
| 4,024,528 | 5/1977 | Boggs et al. | 340/310 |
| 4,130,861 | 12/1978 | LaForest | 363/39 |
| 4,270,206 | 5/1981 | Hughes | 375/9 |
| 4,292,546 | 9/1981 | Clark | 307/114 |
| 4,348,582 | 9/1982 | Budek | 219/483 |
| 4,408,186 | 10/1983 | Howell | 340/310 |
| 4,452,291 | 6/1984 | Eisenhandler | 370/54 |
| 4,481,429 | 11/1984 | Christopher | 307/296 R |
| 4,500,837 | 2/1985 | Shuey et al. | 324/102 |
| 4,551,780 | 11/1985 | Canay | 361/113 |
| 4,628,443 | 12/1986 | Rickard et al. | 364/184 |
| 4,628,503 | 12/1986 | Grams et al. | 370/85 |
| 4,645,956 | 2/1987 | Shuey | 307/562 |
| 4,668,934 | 5/1987 | Shuey | 340/310 |
| 4,686,382 | 8/1987 | Shuey | 307/149 |
| 4,697,166 | 9/1987 | Warnagiris et al. | 340/310 |
| 4,703,306 | 10/1987 | Barritt | 340/310 |
| 4,746,897 | 5/1988 | Shuey | 340/310 |
| 4,756,009 | 7/1988 | Braun et al. | 375/86 |
| 4,760,375 | 7/1988 | Stecker | 340/310 |
| 4,766,414 | 8/1988 | Shuey | 340/310 |
| 4,774,716 | 9/1988 | Hagmann | 375/83 |
| 4,800,363 | 1/1989 | Braun et al. | 340/310 |
| 4,809,296 | 2/1989 | Braun et al. | 375/1 |
| 4,815,106 | 3/1989 | Propp et al. | 375/36 |
| 4,835,517 | 5/1989 | van der Gracht | 340/310 |
| 4,841,281 | 6/1989 | Melvin, Jr. | 340/310 |
| 4,890,089 | 12/1989 | Shuey | 340/310 |
| 4,899,129 | 2/1990 | MacFayden et al. | 340/310 |
| 4,914,418 | 4/1990 | Mak et al. | 340/310 |
| 4,962,496 | 10/1990 | Vercellotti | 370/11 |
| 4,973,940 | 11/1990 | Sakai et al. | 340/310 R |
| 5,090,024 | 2/1992 | Vander Mey | 375/1 |
| 5,097,249 | 3/1992 | Yamamoto | 340/310 |
| 5,101,191 | 3/1992 | MacFadyen et al. | 340/310 |
| 5,142,277 | 8/1992 | Yarberry et al. | 340/310.02 |
| 5,151,838 | 9/1992 | Dockery | 340/310 |
| 5,185,591 | 2/1993 | Shuey | 340/310 |
| 5,198,796 | 3/1993 | Hessling, Jr. | 340/310 |

(List continued on next page.)

*Primary Examiner*—Edward Lefkowitz
*Assistant Examiner*—Davetta Woods
*Attorney, Agent, or Firm*—Woodcock Washburn Kurtz Mackiewicz & Norris LLP

[57] ABSTRACT

Methods and apparatus for establishing communications between electrical and electronic devices utilizing existing power signal distribution networks are disclosed. In such methods and apparatus the transmitting and receiving components of such devices are coupled between line and ground. Such coupling is achieved utilizing a coupler, a first frequency reactive device, such as a drain coil or inductor, connected in series with neutral and a second frequency reactive device, such as a capacitor connected between neutral ground. For use with existing electronic equipment, an adaptor for coupling the communications signal to a power signal distribution network is also disclosed. Since, line and neutral paths may sometimes be mis-wired, the apparatus and methods also disclose the use of a switch for enabling the coupling of a communication signal when a power signal is sensed on the line path.

18 Claims, 3 Drawing Sheets

U.S. PATENT DOCUMENTS

| | | | |
|---|---|---|---|
| 5,257,006 | 10/1993 | Graham et al. | 340/310 A |
| 5,289,158 | 2/1994 | Neves | 340/309 |
| 5,391,932 | 2/1995 | Small et al. | 307/125 |
| 5,404,127 | 4/1995 | Lee et al. | 340/310.02 |
| 5,424,587 | 6/1995 | Federowicz | 307/140 |
| 5,424,710 | 6/1995 | Baumann | 340/310.01 |
| 5,434,558 | 7/1995 | Zeder | 340/568 |
| 5,442,335 | 8/1995 | Cantin et al. | 340/825.71 |
| 5,448,229 | 9/1995 | Lee, Jr. | 340/870.02 |
| 5,459,459 | 10/1995 | Lee, Jr. | 340/870.02 |
| 5,471,190 | 11/1995 | Zimmermann | 340/310.01 |
| 5,694,108 | 12/1997 | Shuey | 340/310.01 |

APPARATUS AND METHODS FOR POWER NETWORK COUPLING

FIELD OF THE INVENTION

The present invention relates generally to the field of inter-device communication and more particularly, the invention relates to methods and apparatus for improving communication between electronic devices through power signal distribution networks.

BACKGROUND OF THE INVENTION

For some time, it has been desirable for electrical and electronic devices to communicate and share information, particularly in environments where such devices are operated within a single facility such as an industrial plant, office building or residence. To this end, a need has been discussed for electronic communications to occur between products such as data terminals, remote printers, personal computers, entertainment systems, refrigerators, washers, dryers lights, security and temperature control systems all of which may be operated within a single facility.

Various schemes have been proposed to accomplish such inter-element communication, including forms of radio transmission, light transmission and dedicated communication networks. It has also been suggested in the past that such inter-element communication can be efficiently accomplished utilizing in situ power distribution networks. For example in U.S. Pat. No. 4,697,166—Warnagiris et al., incorporated herein by reference, describes one such system for inter-element communication system, known as the ANI PLC (Power Line Carrier) system.

As recognized in U.S. Pat. No. 5,471,190—Zimmermann, incorporated herein by reference, in the late 1980's, there was a growing interest in communication networks for home automation systems and products to facilitate the interconnection of lights, appliances, sensors and control devices. One system, critically described in this patent was the so-called X-10 system. Eventually, an industry standard was adopted by the Electronics Industries Association which standard was called CEBus (Consumer Electronic Bus).

The CEBus protocol is described in U.S. Pat. No. 5,471,190 as being a low cost, low speed local areal network that uses a power line carrier to send control information over typical house electrical power wiring. Data is transmitted in packets utilizing spread spectrum techniques, such as those described in U.S. Pat. No. 5,090,024—Vander May et al., incorporated herein by reference, utilizing carrier frequencies between 100 kHz and 400 kHz.

One universal problem with all such inter-element communication schemes is noise present on the power lines which interferes with the communication signals. Such noise is generally attributed to motors and electronic switching devices attached to the power network. In addition to the patents already referenced, this problem is also highlighted in U.S. Pat. Nos. 4,815,106—Propp et al. and 5,452,291—Eisenhandler et al., both of which are incorporated herein by reference. Indeed, U.S. Pat. No. 4,815,106 specifically states that to overcome the noise problem and make the "smart home" a reality, less expensive equipment is needed to connect consumer devices to CEBus networks.

Early installations of CEBus power line devices demonstrated difficulties in communicating across phases of the typical 120/120/240 volt secondary service provided by distribution transformers. A generally adopted solution to this problem was power and communication coupling between line voltage and neutral. However, this solution did not prove sufficiently successful in cross phase communication. For example, in a residence environment, difficulties would occur when communications were attempted between a device connected to the 120 volt circuit for one floor and a device connected to the 120 volt circuit for another floor. Each of U.S. Pat. Nos. 4,815,106 and 5,471,190 disclose the line/neutral coupling technique.

Accordingly, a need still exists for apparatus and methods which will facilitate the accurate transmission of communication signals in power line networks.

SUMMARY OF INVENTION

The above described problems are resolved and other advantages are achieved in methods and apparatus for establishing communications between first and second electronic devices adapted for connection to a power distribution network. The transmitting and receiving components of such devices are coupled between line and ground. To achieve such a method a coupler is utilized for coupling the communication signal between line and ground. A first frequency reactive device, such as a drain coil or inductor, is connected in series with neutral. The impedance of the first frequency reactive device increases as the frequency of an applied signal increases. A second frequency reactive device, such as a capacitor, is connected between neutral and ground. The impedance of the second frequency reactive device decreases as the frequency of an applied signal increases.

An adaptor including the first and second frequency reactive devices is utilized for improving communications from and to existing electrical or electronic equipment. Such adaptor, is also provided with Zener diode pair connected in parallel with the first frequency reactive device.

Since, line and neutral paths may sometimes be mis-wired, the apparatus and methods of the invention also incorporate the use of a switch for enabling the coupling of a communication signal when a power signal is sensed on the line path.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which.

DETAILED DESCRIPTION OF THE INVENTION

Figure 1:
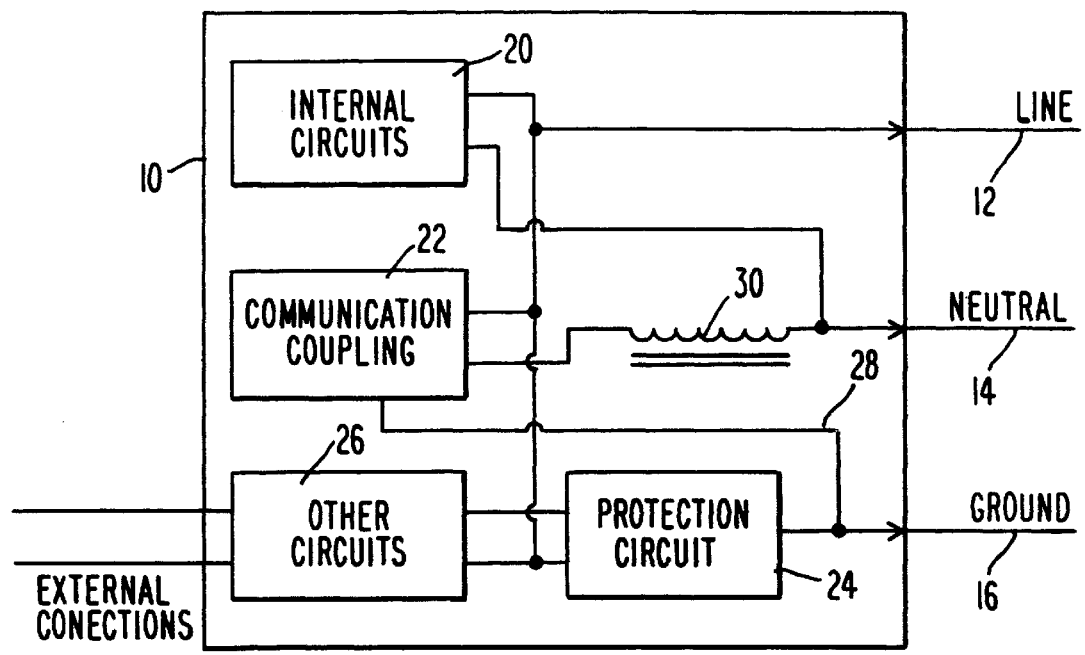
FIG. 1 is a block diagram of an electronic device constructed in accordance with the present invention for communication in a power signal distribution network.

Referring to FIG. 1, there is shown an electronic device 10 constructed in accordance with the present invention for providing improved inter-device communication for devices connected to a power distribution network. At the outset it is to be understood that while the invention may be described herein in terms of a home power distribution network or a CEBus network, the applicability and scope of the invention is not so limited.

Device 10 is connected to a power distribution network including line 12, ground 16 and neutral 14 paths. Within device 10 are various collections of circuits generally divided into internal circuits 20 for carrying out the primary functions of device 10, communication coupling circuits 22 for transmitting and receiving communication signals, protection circuits 24 for protection against surges and other undesirable electrical disturbances and other circuits 26, such as I/O, etc. The electrical interconnection details of these internal circuits is not necessary to understand the invention and consequently, will not be discussed herein.

Communication coupling circuits are shown to be connected to line 12. A coupler 28 is provided for connecting the communication coupling circuits to ground. In this way, coupler 28 serves to couple the communication signal between line 12 and ground 16. As will become more apparent in relation to FIG. 2, the power signal remains connected between line 12 and neutral 14. It has been found that coupling communication signals between line voltage and ground improves the noise characteristics and as a result improves communication performance. However, coupling between line voltage and ground raises a semi-regulatory problem.

Underwriters Laboratory (UL) requires that any power frequency current delivered to the ground connection be less than 0.25 mA. In CEBus applications incorporating the present invention, coupling capacitance would draw more current than the 0.25 mA limit. In order to meet this semi-regulatory requirement something more is required to the exchange of neutral and ground leads for communications.

Referring again to FIG. 1, a frequency reactive device 30, such as a drain coil or inductor, is placed in series with neutral path 14. The impedance exhibited by device 30 will increase as the frequency of the signal applied to device 30 increases. In other words, the inductance value associated with coil 30 is selected so that signals having frequencies on the order of power frequencies, typically, 50 or 60 Hz, experience very little impedance by device 30. In the preferred embodiment device 30 is a slug type inductor having values of 1 mH, 250 mA.

It will be appreciated from the above that inductor 30 will allow power signals to pass freely while imposing significant impedances to communication signals having frequencies on the order of 100 kHz to 400 kHz, such as CEBus signals. In such a situation the path of least resistance for the communication signals is to ground 16. Inductor 30 is thus acting to take almost all of the power frequency current, keeping the power frequency current to ground below the UL limitation.

Figure 2:
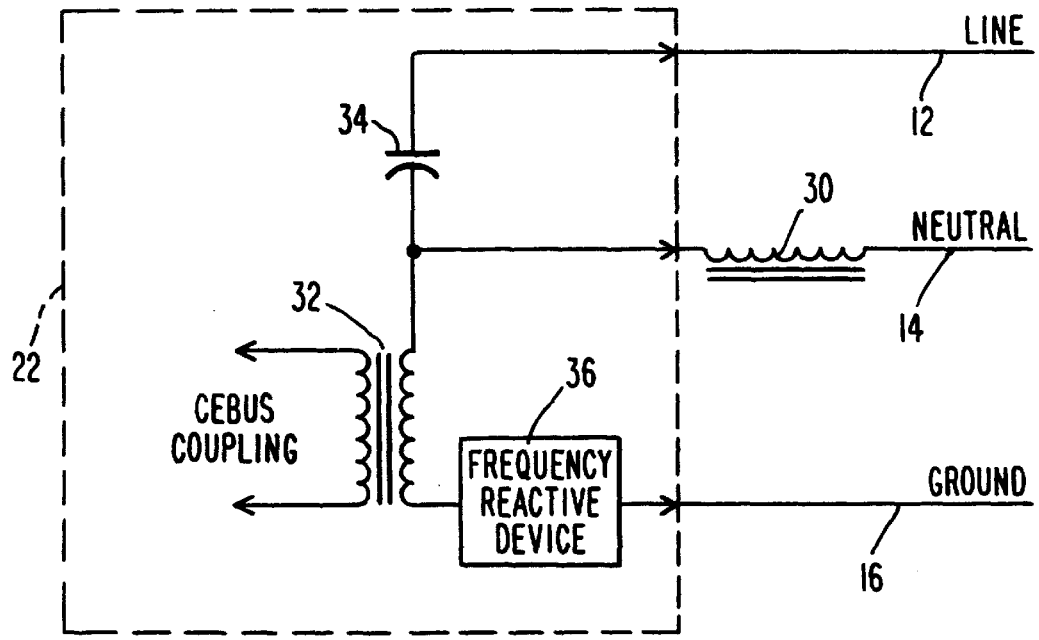
FIG. 2 is a schematic diagram of a portion of the device shown in FIG. 1.

Referring now to FIG. 2, a portion of the communication coupling circuits 22 is shown in greater detail. Coupling transformer 32 is connected as a coupler for coupling a CEBus signal to line 12 and ground 16. A coupling capacitor 34 is connected between line 12 and neutral 14 for applying power frequency currents to line 12. A second frequency reactive device 36, such as a capacitor, is connected between transformer 32 and ground 36. The particular design of device 36 will vary depending on the application, i.e., CEBus, ANI PLC, X-10, etc., however, the function remains the same, namely that the impedance exhibited by device 36 will decrease as the frequency of the applied signal increases. In the preferred embodiment, device 36 is a capacitor having values of approximately 0.1 $\mu f$, 50 VAC.

It will be appreciated from the above that CEBus signals coupled between line 12 and ground 16 will experience high impedance by inductor 30 and low impedance by capacitor 36. Such signals will consequently, travel between line 12 and ground 16. Moreover, since inductor 30 is exhibiting a relatively low impedance to the power frequency current, a low steady state voltage, i.e., on the order of approximately 100 mV, will be established. Such a low voltage results in a current flowing through device 36 to ground on the order of approximately a few microamps. Such a current is well within the UL limitation. It will be appreciated that appropriate selection of capacitor and inductor values for devices 30 and 36 can also prevent surges resulting from component failure.

One complication raised by the above described invention is that existing equipment, designed for neutral connection, will require alteration to accommodate the ground coupling technique. Such alterations may be impractical. Accordingly, an adaptor has been developed to achieve the desired communication coupling.

Figure 3:
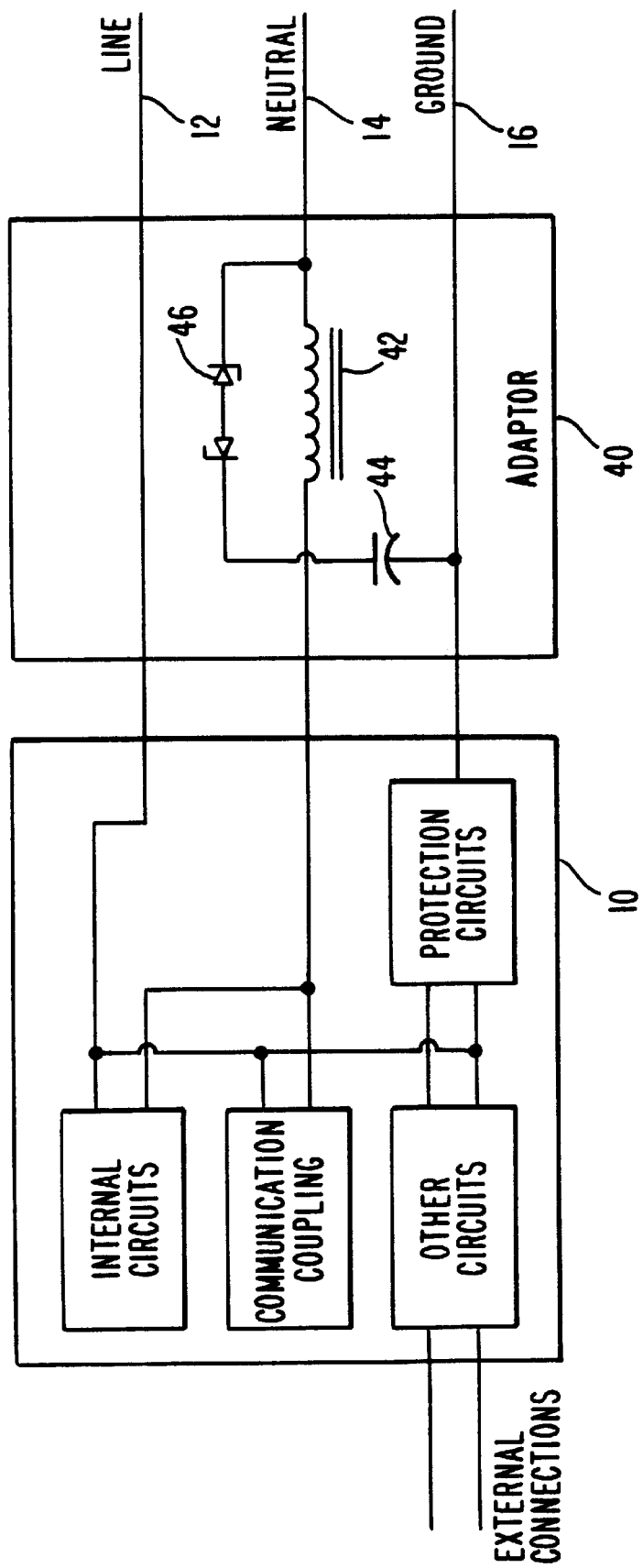
FIG. 3 is a schematic diagram of an adaptor constructed in accordance with the present invention for coupling the communication components of an electronic device to a power signal distribution network.

Referring to FIG. 3, there is shown an adaptor 40 having line 12, neutral 14 and ground 16 paths passing therethrough. A drain coil or inductor 42, i.e., a frequency reactive device, is placed in the neutral path. Coil 42 reacts identically to device 30 described above. A capacitor 44, i.e., a frequency reactive device, is connected between neutral 14 and ground 16 and acts identically to device 36 described above. It will thus be appreciated that power frequency signals will be taken almost completely by neutral 14 while communication signals will pass through capacitor 44 to ground 16.

A pair of Zener diodes 46 is also shown connected in parallel with coil 42. In the preferred embodiment diodes 46 are 10 V, 1 Watt zeners or equivalent mov Harris V12RA8 diodes. Diodes 46 are intended to protect against transient currents due to high frequency voltages associated with switch closures and the like. The goal being to pass the voltage transients to neutral while still allowing CEBus signals to pass to ground. To achieve this goal, Zener values are selected to be slightly above the communication transmit voltage, i.e., the CEBus transmit voltage.

In summary, a method for establishing communications between first 10 and second devices (not shown) has been developed. Each device includes transmitting and receiving components 22 for transmitting and receiving communication signals. Each device is also adapted for connection to a power distribution network, including line, ground and neutral paths. The communication signals are transmitted and received by coupling the transmitting and receiving components between the line path and the ground path.

Apparatus has also been described for coupling a communications signal to a power signal distribution network, where the network includes line, ground and neutral paths. The apparatus includes, a coupler 32 for coupling the communication signal between the line and ground paths. A frequency reactive device 30 is connected in series with the neutral path. Reactive device 30 operates so that its impedance increases as the frequency of the applied signal increases. A second frequency reactive device 36 is connected between neutral and ground. The impedance of reactive device 36 decreases as the frequency of the applied signal increases.

The invention may also be considered as including a coupler for coupling the communication signal between line and ground; a first filter, connected to neutral, to allow the power signal to pass therethrough; and a second filter, connected to ground, to allow the communications signal to pass therethrough.

Although the invention is useful as a CEBus coupler for coupling a communications signal to a power signal distribution network, a problem has been discovered for applications where the power wiring in the distribution network has been reversed. In some home applications, the line and neutral leads have been reversed. For most home applications such mis-wiring presents no problem for AC voltage devices. However, inter-element communication using a CEBus system in a mis-wired application will likely cause excessive ground leakage current to occur.

Figure 4:
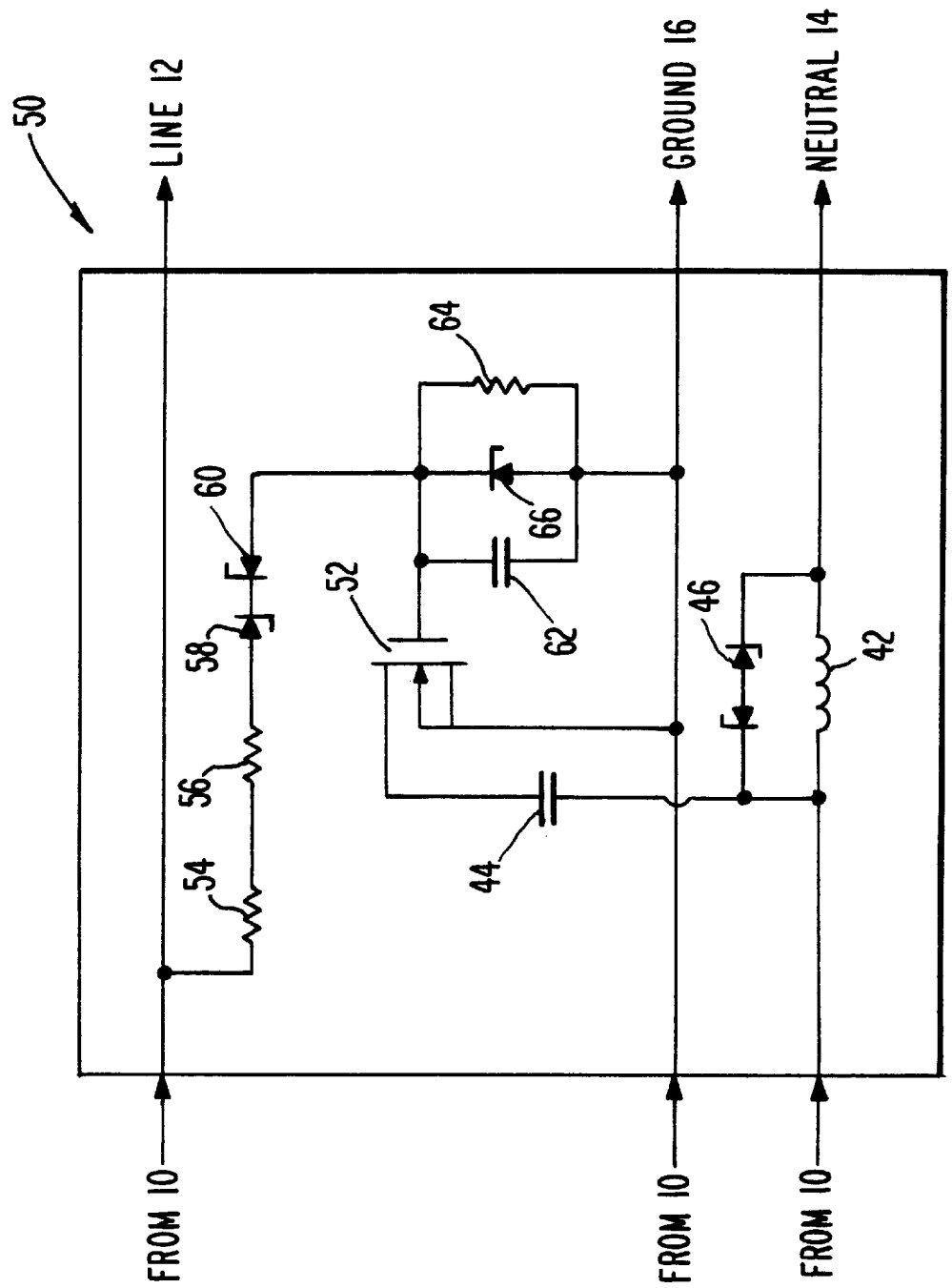
FIG. 4 is a schematic diagram of the adaptor shown in FIG. 3, further incorporating components for enabling or disabling the coupling of communication components if the line and neutral paths of the power signal distribution network have been mis-wired.

Referring now to FIG. 4, there is shown an adaptor 50 which achieves the benefits of adaptor 40 when the line 12 and neutral 14 paths are properly wired and which limits ground leakage current when such paths are mis-wired. As shown in the figure, when the power distribution system is properly wired, the gate-source of transistor 52 will be charged positively through resistors 54, 56 and diodes 58 and 60. In the preferred embodiment, transistor 52 is an IRF820 500 volt, 1 amp MOSFET, resistors 54 and 56 are 230 kΩ, ¼ watt carbon film resistors and diodes 58 and 60 are IN4774A 1 watt Zener diodes.

Capacitor 62 and resistor 64 are selected to maintain the charge through the negative half cycle of the power signal (in the USA a 60 Hz signal) so that transistor 52 is "on" all the time an alternating current (AC) power signal is applied to the coupler. With AC supplied and transistor 52 "on," capacitor 44 is connected from ground to neutral for the CEBus coupling operation described previously. Inductor 42, serves the same purpose as that discussed in relation to FIG. 3, namely, blocking CEBus signals and noise from passing through neutral 14.

If the system voltage connections to coupler 50 are ever reversed, the drive components to the gate-source of transistor 52 will be connected across neutral to ground resulting in a low differential voltage. This low differential voltage will leave transistor 52 in an "off" state and, as a result, capacitor 44 will charge (through the reverse diode in transistor 52) to the peak of system voltage.

The transistor 52 "off" voltage will be line voltage superimposed on the direct current (DC) charge voltage on capacitor 44. As a result, transistor 52 will be required to standoff approximately 325 volts DC if the system voltage connections are reversed. A low current, 500 volt MOSFET is selected for this application.

Using coupler 50, the CEBus system will not couple efficiently for a mis-wired 60 Hz power configuration and will also not cause significant ground current to flow which could cause injury. The UL requirements for 0.25 mA maximum ground leakage current will be met for both the normal connections and the reverse connections using this coupler design. When the system is connected normally, CEBus ground coupling will operate normally. When the system connections are reversed, the coupler will essentially disable CEBus communications while limiting the leakage current.

Although not specifically described, diode 66, in the preferred embodiment is an IN4774A 1 watt Zener diode.

While the invention has been described and illustrated with reference to specific embodiments, those skilled in the art will recognize that modification and variations may be made without departing from the principles of the invention as described herein above and set forth in the following claims.

What is claimed is:

1. Apparatus for coupling a communications signal to a power signal distribution network, said network comprising line, ground and neutral paths, said apparatus comprising, a coupler for coupling said communication signal between said line and ground paths, a switch connected to said coupler for enabling said coupler when a power signal is applied to said line path, and a first frequency reactive device, connected in series with said neutral path, wherein the impedance of said first frequency reactive device increases as the frequency of a signal applied to said first frequency reactive device increases.

2. The apparatus of claim 1, wherein said first frequency reactive device comprises a drain coil, connected in series with said neutral path.

3. The apparatus of claim 1, wherein said first frequency reactive device comprises an inductor, connected in series with said neutral path.

4. The apparatus of claim 1, further comprising a second frequency reactive device, connected between said neutral path and said ground path, wherein the impedance of said second frequency reactive device decreases as the frequency of a signal applied to said second frequency reactive device increases.

5. The apparatus of claim 4, wherein said second frequency reactive device comprises a capacitor.

6. An adaptor for coupling a communications signal to a power signal distribution network, said network comprising line, ground and neutral paths, said adaptor comprising: a first frequency reactive device, connected in series with said neutral path, wherein the impedance of said first frequency reactive device increases as the frequency of a signal applied to said first frequency reactive device increases; a second frequency reactive device, connected between said neutral path and said ground path, wherein the impedance of said second frequency reactive device decreases as the frequency of a signal applied to said second frequency reactive device increases; and a switch, connected to said second frequency reactive device, for enabling said second frequency reactive device when a power signal is applied to line path.

7. The adaptor of claim 6, wherein said first frequency reactive device comprises an inductor, connected in series with said neutral path.

8. The adaptor of claim 6, wherein said second frequency reactive device comprises a capacitor.

9. The adaptor of claim 6, wherein said switch comprises a transistor.

10. The adaptor of claim 9, wherein said transistor comprises a MOSFET and wherein the drain-source portion of said MOSFET is connected in series with said second frequency reactive device.

11. The adaptor of claim 10, wherein the gate of said MOSFET is electrically connected to said line path.

12. The adaptor of claim 11, further comprising a resistor and a capacitor connected to each other in parallel and connected to said line path and connected to the gate of said MOSFET, so that the charge on said gate is maintained.

13. A method for coupling a communications signal to a power signal distribution network, said network comprising line ground and neutral paths, said method comprising the steps of: sensing the presence of a power signal on said line path; transmitting said communication signal on said line and ground paths when a power signal is sensed on said line path; and blocking the transmission of said communication signal on said neutral path.

14. The method of claim 13, wherein the step of transmitting comprises the step of connecting a coupler, for coupling said communication signal, between said line and ground paths and connecting a first frequency reactive device to said neutral path, wherein the impedance of said first frequency reactive device increases as the frequency of a signal applied to said first frequency reactive device increases.

15. The method of claim 14, wherein said step of connecting a first frequency reactive device comprises the step of connecting an inductor in series with said neutral path.

16. The method of claim 13, further comprising the step of connecting a second frequency reactive device between said neutral path and said ground path, wherein the impedance of said second frequency reactive device decreases as the frequency of a signal applied to said second frequency reactive device increases.

17. The method of claim 16, wherein said step of connecting a second frequency reactive device comprises the step of connecting a capacitor between said neutral path and said ground path.

18. The method of claim 13, further comprising the step of disabling the transmission of said communication signal on said line and ground paths when a power signal is not sensed on said line path.

* * * * *

UNITED STATES PATENT AND TRADEMARK OFFICE
CERTIFICATE OF CORRECTION

PATENT NO. : 5,933,073
DATED : August 3, 1999
INVENTOR(S) : Kenneth C. Shuey

It is certified that error appears in the above-identified patent and that said Letters Patent is hereby corrected as shown below:

Prior to the heading "FIELD OF THE INVENTION" please insert the following paragraph:

--Cross Reference to Related Applications

This application is a continuation-in-part of U.S. Serial No. 08/637,935 filed May 1, 1996, now U.S. Patent 5,694,108--

Signed and Sealed this

Fourth Day of April, 2000

Attest:

Attesting Officer

Q. TODD DICKINSON

Director of Patents and Trademarks